(12) United States Patent
Blacker et al.

(10) Patent No.: US 7,744,955 B2
(45) Date of Patent: Jun. 29, 2010

(54) METHOD OF THERMALLY TEMPERING COATED ARTICLE WITH TRANSPARENT CONDUCTIVE OXIDE (TCO) COATING USING FLAME(S) IN TEMPERING FURNACE ADJACENT TCO TO BURN OFF OXYGEN AND PRODUCT MADE USING SAME

(75) Inventors: Richard Blacker, Farmington Hills, MI (US); Cory Richardson, Flat Rock, MI (US); Alexey Krasnov, Canton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1240 days.

(21) Appl. No.: 11/194,759

(22) Filed: Aug. 2, 2005

(65) Prior Publication Data

US 2007/0031593 A1  Feb. 8, 2007

(51) Int. Cl.
*B05D 3/08* (2006.01)
*B05D 5/06* (2006.01)
*B05D 3/02* (2006.01)

(52) U.S. Cl. .................... 427/224; 427/108; 427/126.2; 427/126.3; 427/162; 427/223; 427/372.2

(58) Field of Classification Search ................. 427/162, 427/223, 372.2
See application file for complete search history.

(56) References Cited

U.S. PATENT DOCUMENTS

| | | | |
|---|---|---|---|
| 3,951,634 A | 4/1976 | Hall et al. | |
| 3,973,942 A | 8/1976 | Coen et al. | |
| 3,996,035 A | 12/1976 | McHenry | |
| 4,004,901 A | 1/1977 | Starr | |
| 4,046,543 A | 9/1977 | Shields | |
| 4,433,993 A | 2/1984 | Frank | |
| 4,437,872 A | 3/1984 | McMaster et al. | |
| 4,859,499 A * | 8/1989 | Sauvinet et al. | 427/108 |
| 4,946,491 A | 8/1990 | Barr | |
| 5,232,482 A | 8/1993 | Laakso et al. | |
| 5,252,140 A * | 10/1993 | Kobayashi et al. | 136/258 |
| 5,304,499 A | 4/1994 | Bonnet et al. | |
| 5,387,433 A | 2/1995 | Balian et al. | |
| 5,443,609 A | 8/1995 | Lehto | |
| 5,735,922 A | 4/1998 | Woodward et al. | |
| 5,735,923 A | 4/1998 | Hisaeda | |
| 5,755,845 A | 5/1998 | Woodward et al. | |
| 5,827,345 A | 10/1998 | Boaz et al. | |
| 5,868,871 A | 2/1999 | Yokose et al. | |
| 5,893,941 A | 4/1999 | Nikander | |

(Continued)

FOREIGN PATENT DOCUMENTS

WO  WO 01/02622  1/2001

*Primary Examiner*—Michael Kornakov
*Assistant Examiner*—Alexander Weddle
(74) *Attorney, Agent, or Firm*—Nixon & Vanderhye P.C.

(57) ABSTRACT

A method of making a coated article including a transparent conductive oxide (TCO) film supported by a glass substrate is provided. In certain example embodiments, the coated article including the TCO film on the glass substrate is thermally tempered in a tempering furnace. In certain example embodiments, during tempering flame(s) are provided proximate the exposed surface of the TCO in order to burn off excess oxygen near the TCO surface thereby preventing or reducing oxidation of the TCO during the tempering process. A coated article, that is thermally tempered, made by such a product is also provided.

20 Claims, 3 Drawing Sheets

U.S. PATENT DOCUMENTS

| | | | |
|---|---|---|---|
| 5,922,142 A | 7/1999 | Wu et al. | |
| 5,928,398 A | 7/1999 | Lehto | |
| 5,938,810 A | 8/1999 | De Vries, Jr. et al. | |
| 5,951,734 A | 9/1999 | Friedel et al. | |
| 5,974,834 A | 11/1999 | Rijkens et al. | |
| 6,137,048 A * | 10/2000 | Wu et al. | 136/260 |
| 6,169,246 B1 | 1/2001 | Wu et al. | |
| 6,221,495 B1 | 4/2001 | Wu et al. | |
| 6,251,701 B1 | 6/2001 | McCandless | |
| 6,261,693 B1 | 7/2001 | Veerasamy | |
| 6,436,541 B1 | 8/2002 | Sopko et al. | |
| 6,602,606 B1 | 8/2003 | Fujisawa et al. | |
| 6,849,328 B1 | 2/2005 | Medwick et al. | |
| 2002/0035852 A1 | 3/2002 | Wang et al. | |
| 2003/0059540 A1* | 3/2003 | Berni et al. | 427/376.1 |
| 2003/0124392 A1* | 7/2003 | Bright | 428/698 |
| 2003/0177792 A1 | 9/2003 | Longobardo et al. | |
| 2004/0180216 A1 | 9/2004 | Veerasamy et al. | |
| 2005/0048284 A1 | 3/2005 | Veerasamy | |
| 2005/0095431 A1 | 5/2005 | Veerasamy | |

* cited by examiner

METHOD OF THERMALLY TEMPERING COATED ARTICLE WITH TRANSPARENT CONDUCTIVE OXIDE (TCO) COATING USING FLAME(S) IN TEMPERING FURNACE ADJACENT TCO TO BURN OFF OXYGEN AND PRODUCT MADE USING SAME

This invention relates to a method of making a coated article including a transparent conductive oxide (TCO) film supported by a glass substrate. In certain example embodiments, the coated article including the TCO film on the glass substrate is thermally tempered in a tempering furnace. In certain example embodiments, during tempering flame(s) are provided proximate the exposed surface of the TCO in order to burn off excess oxygen near the TCO surface thereby preventing or reducing oxidation of the TCO during the tempering process. A coated article, that is thermally tempered, made by such a product is also provided. Coated articles according to certain example non-limiting embodiments of this invention may be used in applications such as solar cells, oven doors, defrosting windows, or other types of windows in certain example instances.

BACKGROUND AND SUMMARY OF EXAMPLE EMBODIMENTS OF INVENTION

Typically, methods of forming TCOs on glass substrates require high glass substrate temperatures. Such methods include chemical pyrolysis where precursors are sprayed onto the glass substrate at approximately 400 to 500 degrees C., and vacuum deposition where the glass substrate is kept at about 150 to 300 degrees C. Sputter deposition of a TCO at approximately room temperature would also be desirable, given that most float glass manufacturing platforms are not equipped with in-situ heating systems.

There is often a need to thermally temper coated articles having a glass substrate coated with a TCO film/coating. For instance, in certain applications tempering is required by code (e.g., e.g., for windows over doorways, for windows identified as breakable windows for firemen, and other applications). Thermal tempering typically requires heating the glass substrate with a coating thereon in a tempering furnace at a temperature of at least about 580 degrees C., more preferably at least about 600 degrees C., and often at least about 620 or 640 degrees C. (e.g., for at least about 2 minutes, more preferably for at least about 5 minutes). Thus, it will be appreciated that thermal tempering involves very high temperatures.

Conventional temperable TCOs use pyrolytically processed fluorine-doped tin dioxide as the material for the TCO coating. However, it would also be desirable for a TCO to be able to be deposited by sputtering so that it could be performed at approximately room temperature.

However, glass supporting sputter-deposited TCOs cannot be thermally tempered without the TCOs suffering a significant loss in electrical conductivity. Glass tempering temperatures (see above) cause a rapid conductivity drop in certain TCOs (e.g., sputter-deposited zinc oxide inclusive TCOs). It is believed that this drop in conductivity is due to oxidation of the TCO during the tempering process.

Thus, it will be appreciated that there exists a need in the art for an improved technique or method of tempering glass substrates including TCO films/coatings thereon, which can prevent or reduce oxidation of the TCO during tempering and thus allow the TCO to substantially maintain its electrical conductivity in certain example instances.

In certain example embodiments of this invention, a method is provided for thermally tempering a glass substrate with a TCO film/coating thereon. The thermal tempering typically involves heating the glass substrate with the TCO coating thereon in a tempering furnace at a temperature of at least about 580 degrees C., more preferably at least about 600 degrees C., and often at least about 620 or 640 degrees C. The glass substrate with the TCO coating thereon may be in the tempering furnace for at least about 2 minutes, more preferably for at least about 5 minutes, in certain example embodiments of this invention. In certain example embodiments, flame(s) are provided proximate the exposed surface of the TCO in the tempering furnace in order to burn off excess oxygen near the TCO surface thereby preventing or reducing oxidation of the TCO during the tempering process. By reducing oxidation of the TCO during the tempering process, more of the electrical conductivity of the TCO coating can be maintained during and/or after tempering.

In certain example embodiments, the flame(s) need not be provided in the entire tempering furnace. In certain example embodiments, the flame(s) are provided in locations so that the flame are only proximate the surface of the TCO film once the glass and/or TCO film reaches a predetermined temperature at or near the TCO oxidation temperature which can vary based on the material making up the TCO film.

In certain example embodiments of this invention, the TCO film may be sputter-deposited on a glass substrate (either directly or indirectly) at approximately room temperature. In alternative embodiments, it is possible to pre-heat the glass substrate prior to the sputter-deposition of the TCO film. In certain example embodiments, however, the flame(s) discussed herein may be used in connection with tempering TCO films deposited via pyrolysis. Example TCO films include films of or including $ZnAlO_x$:Ag, ZnO, ITO (indium tin oxide), $SnO_2$ and/or $SnO_2$:F. Other types of TCO films may instead be used.

In certain example embodiments of this invention, there is provided a method of making a coated article including a transparent conductive film, the method comprising: providing a glass substrate; forming a film comprising a transparent conductive oxide on the glass substrate; and tempering the coated article including the glass substrate and the film comprising the transparent conductive oxide, and wherein at least one flame is provided in a tempering furnace in order to burn off oxygen to prevent or reduce oxidizing of the film comprising transparent conductive oxide during tempering.

In other example embodiments of this invention, there is provided a method of making a coated article including a transparent conductive film, the method comprising: providing a glass substrate; forming a transparent conductive film comprising a transparent conductive oxide on the glass substrate; and tempering the coated article including the glass substrate and the transparent conductive film, and wherein at least one flame is provided in a tempering furnace proximate the transparent conductive film.

DETAILED DESCRIPTION OF EXAMPLE EMBODIMENTS OF THE INVENTION

Coated articles including conductive layer(s) according to certain example non-limiting embodiments of this invention may be used in applications such as solar cells, oven doors, defrosting windows, display applications, or other types of windows in certain example instances. For example and without limitation, the conductive layers discussed herein may be used as electrodes in solar cells, as heating layers in defrosting windows, as solar control layers in windows, and/or the like.

Figure 1:
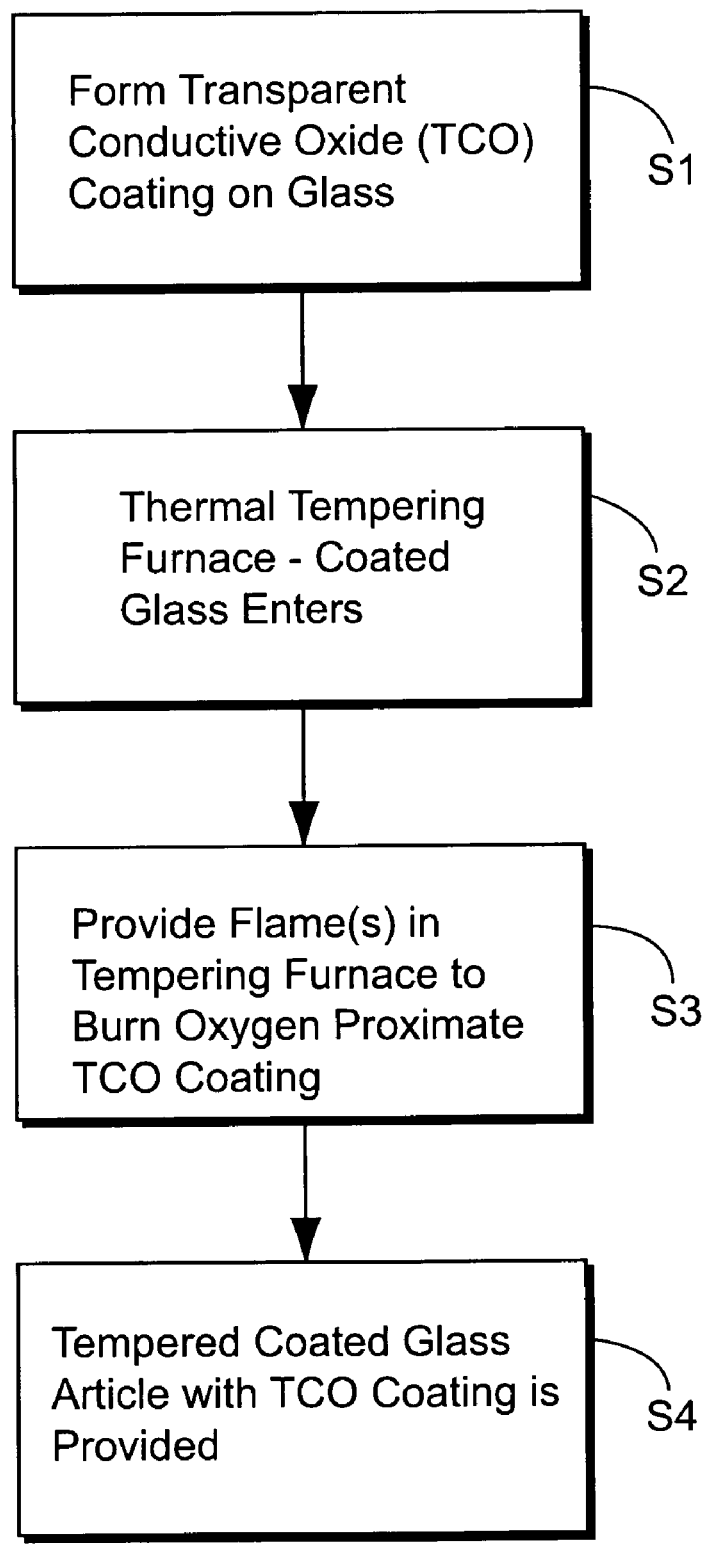
FIG. 1 is a flowchart illustrating a method of making a thermally tempered coated article according to an example embodiment of this invention.

FIG. 1 is a flowchart illustrating certain steps carried out in making a thermally tempered coating article according to an example embodiment of this invention. Initially, a film or coating 3 of or including a transparent conductive oxide (TCO) is formed or deposited on a glass substrate 1 (step S1 in FIG. 1; see also film 3 on glass substrate 1 in FIG. 2). For the TCOs discussed herein, they are substantially substoichiometric with respect to oxygen, thereby permitting them to be electrically conductive. In certain example embodiments of this invention, the TCO film 3 may be formed by pyrolysis or be sputter-deposited on a glass substrate 1 (either directly or indirectly) at approximately room temperature. In sputter-deposing embodiments, magnetron sputtering target(s) for example may be used in sputter-deposing the TCO film. In alternative embodiments, it is possible to pre-heat the glass substrate prior to the sputter-deposition of the TCO film. For example and without limitation, example TCO films include films of or including one or more of $ZnAlO_x$, $ZnAlO_x$:Ag, ZnO, $SnZnO_x$, ITO, $SnO_2$ and/or $SnO_2$:F. In certain example instances, the use of $SnZnO_x$ as the TCO film 3 may be advantageous to better tailor the electrical and/or optical properties of the film, e.g., to improve layer etchability for display applications, enhance carrier mobility and/or transmission, and so forth.

After the TCO film 3 has been formed on the glass substrate 1, the coated article including the TCO film 3 on the glass substrate 1 enters a thermal tempering furnace (step S2 in FIG. 1). The thermal tempering typically involves heating the glass substrate 1 with the TCO coating 3 thereon in the tempering furnace at a temperature of at least about 580 degrees C., more preferably at least about 600 degrees C., and often at least about 620 or 640 degrees C. The glass substrate 1 with the TCO coating 3 thereon may be in the tempering furnace for at least about 2 minutes, more preferably for at least about 5 minutes, in certain example embodiments of this invention. Inside the tempering furnace, nozzle(s) are provided to form flame(s) proximate the exposed surface of the TCO film 3 in the tempering furnace in order to burn off excess oxygen near the TCO surface thereby preventing or reducing oxidation of the TCO during the tempering process (step S3 in FIG. 1). In certain example embodiments, the nozzles and thus the flames may be provided in the furnace above or over the substrate with the TCO film thereon. By reducing oxidation of the TCO film 3 during the tempering process, more of the electrical conductivity of the TCO coating can be maintained during and/or after tempering.

After the glass substrate 1 with the coating 3 thereon exits the tempering furnace, the glass is permitted to cool in a known manner thereby resulting in the thermal tempering thereof. Thus, a thermally tempered glass substrate 1 has been provided with a TCO film 3 thereon (step S4 in FIG. 1). The tempered coated article may then be used in monolithic window applications, oven door applications, IG window unit applications, solar cells, heatable window applications, or the like. The TCO may function as a heatable layer/coating (when voltage is applied thereacross) in certain applications such as heatable window applications, or alternatively may function as a heat or IR blocking layer/coating in applications such as oven doors, or alternatively may function as an electrode in applications such as solar cell applications.

Figure 2:
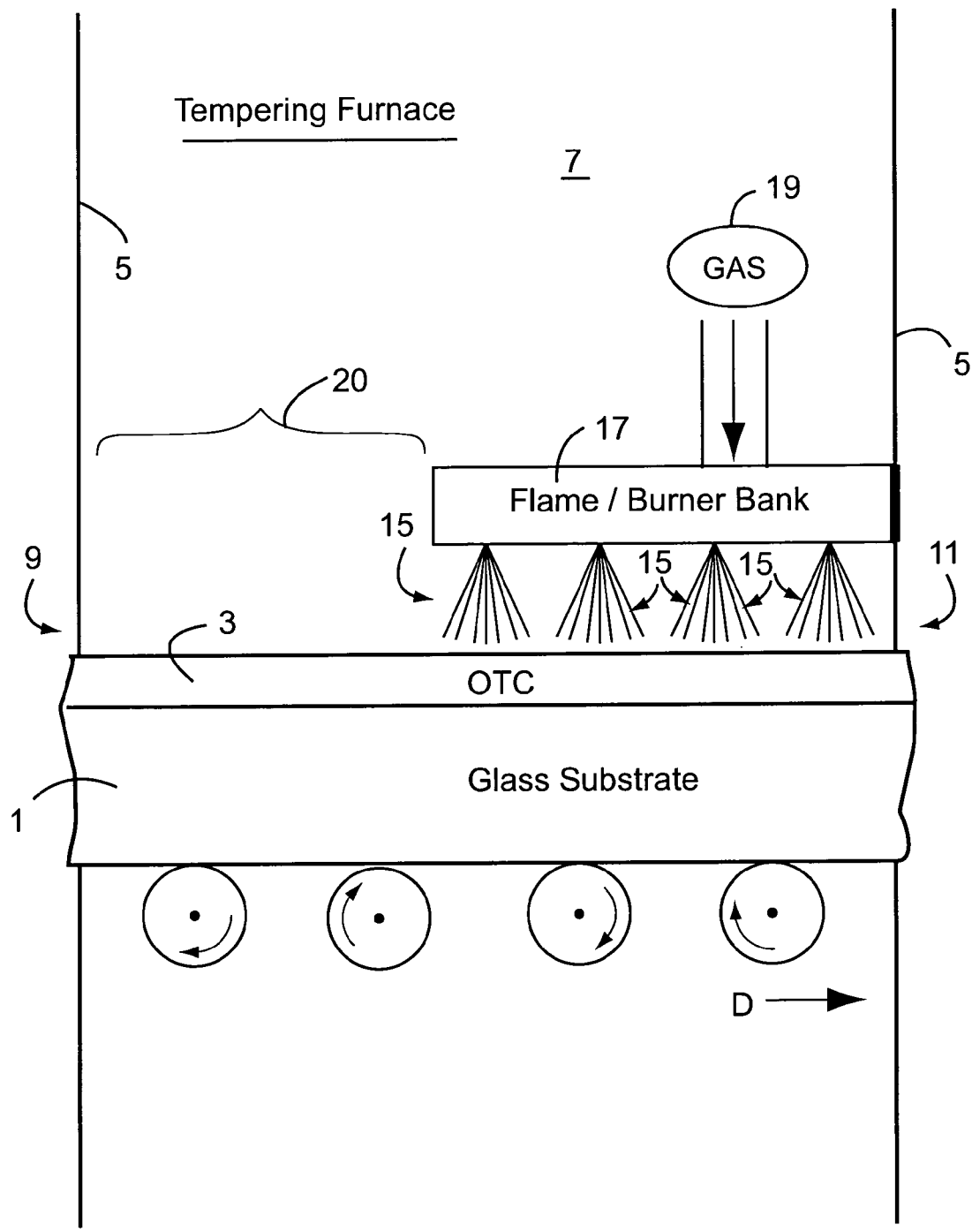
FIG. 2 is a schematic diagram illustrating a coated article in a thermal tempering furnace according to an example embodiment of this invention.

FIG. 2 is a schematic diagram illustrating a coated article in a thermal tempering furnace according to an example embodiment of this invention. In other words, FIG. 2 is an example of what is occurring in steps S2 and S3 of FIG. 1. In FIG. 2, walls 5 are walls of the tempering furnace, so that chamber 7 is the interior of the furnace. The coated glass article including glass substrate 1 and TCO coating 3 enters the tempering furnace at inlet 9, travels in direction D through the furnace, and exits the furnace at outlet 11.

FIG. 2 also includes a cross-sectional view of the coated article including glass substrate 1 and TCO film or layer 3 that is provided on the substrate. Glass 1 may be soda-lime-silica glass in certain example embodiments of this invention, although other types of glass may instead be used. In certain embodiments, TCO layer/coating 3 may be made up of one or more layers and is provided directly on and contacting the top surface of glass substrate 1. However, in other example embodiments of this invention, other layer(s) (not shown) may be provided between the glass substrate 1 and the transparent conductive layer 3. Layer 3 is said to be "on" and "supported" by/on the substrate 1, regardless of whether other layer(s) are provided therebetween. In certain example embodiments of this invention, the coated article has a visible transmission of at least about 30%, more preferably of at least about 50%, and even more preferably of at least about 70%.

FIG. 2 illustrates the provision of flames 15 output from nozzles or burners above the TCO film 3. The flame-outputting nozzles are supported by and/or in flame burner or nozzle bank 17. Gas from source 19 is input into the burner bank 17 and the gas is ignited to form flame(s) 15. In the FIG. 2 embodiment, the flames 15 are located just over top of the coated article, so that the TCO film 3 is between the flames 15 and the glass substrate 1. Flame(s) 15 are provided proximate the exposed surface of the TCO film 3 in the tempering furnace in order to burn off excess oxygen near the TCO surface thereby preventing or reducing oxidation of the TCO during the tempering process. By reducing oxidation of the TCO during the tempering process, more of the electrical conductivity of the TCO coating can be maintained during and/or after tempering. In other words, the flames burn off oxygen or oxide near the top surface of the TCO film 3. In certain example embodiments, the flame(s) 15 burn off the oxygen before it reaches the TCO film 3 so that at least some oxygen is burned off before it can cause the TCO film 3 to oxidize during tempering. The excessive heat caused by the flame(s) 15 from the nozzles may be balanced, or compensated for, by the electrical heating plates (not shown) used in the tempering furnace to generate the heat (i.e., the heating plates may be caused to generate less heat compared to a situation where the flame(s) 15 were not present). A similar method may be used in the case of shake-and-bake tempering processes.

In certain example embodiments of this invention, at least part of flame(s) 15 is/are located within about 20 cm of the upper or exposed surface of the TCO film 3, more preferably without about 15 cm, even more preferably within about 10 cm, still more preferably within about 5 cm. In certain example instances, the flame(s) 15 may be located within about 2 cm (even sometimes within about 1 cm) of the upper or exposed surface of the TCO film 3, and may even contact the TCO film 3 in certain example embodiments of this invention.

In certain example embodiments of this invention, TCO inclusive film 3 is sputter-deposited onto substrate 1 at a low temperature (e.g., less than about 150 degrees C., more preferably less than about 100 degrees C., and possibly at approximately room temperature) so as to include both a primary dopant and a co-dopant. For purposes of example, the film 3 may be zinc oxide based, the primary dopant may be Al, and the optional co-dopant may be Ag. In such an example situation, the TCO film 3 may be of or include $ZnAlO_x$:Ag, where Ag is the co-dopant. Al is the primary charge carrier dopant. However, if too much Al is added (without Ag), its effectiveness as a charge carrier is compromised because the system compensates Al by generating native acceptor defects (such as zinc vacancies). Also, at low substrate temperatures, more clustered electrically inactive (yet optically absorbing) defects tend to occur. However, when Ag is added as a co-dopant, this promotes declustering of the Al and permits more Al to function as a charge generating dopant (Al is more effective when in the Zn substituting sites). Thus, the use of the Ag permits the Al to be a more effective charge generating dopant in the TCO inclusive film 3. Accordingly, the use of Ag in ZnAlO is used to enhance the electrical properties of the film. In certain example embodiments of this invention, the amount of primary dopant (e.g., Al) in the film 3 may be from about 0.5 to 7%, more preferably from about 0.5 to 5%, and most preferably from about 1 to 4% (atomic %). Moreover, in certain example embodiments of this invention, the amount of co-dopant (e.g., Ag) in the film 3 may be from about 0.001 to 3%, more preferably from about 0.01 to 1%, and most preferably from about 0.02 to 0.25% (atomic %). In certain example instances, there is more primary dopant in the film than co-dopant, and preferably there is at least twice as much primary dopant in the film than co-dopant (more preferably at least three times as much, and most preferably at least 10 times as much). Moreover, there is significantly more Zn and O in the film 3 than both Al and Ag, as the film 3 may be zinc oxide based—various different stoichiometries may be used for film 3. The use of both the primary dopant (e.g., Al) and the co-dopant (e.g., Ag) in depositing (e.g., sputter-depositing) the TCO inclusive film (e.g., $ZnAlO_x$:Ag) 3 prevents or reduces the formation of compensating native defects in a wide-bandgap semiconductor material during the impurity introduction by controlling the Fermi level at or proximate the edge of the growth. Immediately after being captured by surface forces, atoms start to migrate and follow the charge neutrality principle. The Fermi level is lowered at the growth edge by the addition of a small amount of acceptor impurity (such as Ag) so it prevents the formation of the compensating (negative in this case) species, such as zinc vacancies. After the initial stage of the semiconductor layer formation, the mobility of atoms is reduced and the probability of the point defect formation is primarily determined by the respective energy gain. Silver atoms in this particular case tend to occupy interstitial sites where they play role of predominantly neutral centers, forcing Al atoms to the preferable zinc substitutional sites, where Al plays the desired role of shallow donors, thus eventually raising the Fermi level. In addition, the provision of the co-dopant (Ag) promotes declustering of the primary dopant (Al), thereby freeing up space in the metal sublattice of the film 3 and permitting more primary dopant (Al) to function as a charge provider so as to improve conductivity of the film. Accordingly, the use of the co-dopant (Ag) permits the primary dopant (Al) to be more effective in enhancing conductivity of the TCO inclusive film 3, without significantly sacrificing visible transmission characteristics. Furthermore, the use of the co-dopant surprisingly improves crystallinity of the TCO inclusive film 3 and thus the conductivity thereof, and grain size of the crystalline film 3 may also increase which can lead to increased mobility. While silver is discussed as a co-dopant in certain example embodiments of this invention, it is possible to use another Group IB, IA or V element such as Cu or Au instead of or in addition to silver as the co-dopant in TCO film 3. Moreover, while Al is discussed as a primary dopant in certain example embodiments of this invention, it is possible to use another material such as Mn (instead of or in addition to Ag) as the primary dopant for the TCO film 3.

In certain example embodiments, the flame(s) 15 and burners therefore may be provided along the entire length of the tempering furnace so that the flame(s) 15 are adjacent the TCO film 3 at all locations in the tempering furnace. However, in certain example embodiments of this invention, as shown in FIG. 2, the flames 15 are not provided along the entire length of the tempering furnace. In particular, the beginning portion 20 of the tempering furnace does not have flame(s) 15 provided therein. This is because the glass 1 and TCO film 3 has not reached an extremely high temperature (for causing TCO to oxidize) in the initial or beginning portion 20 of the tempering furnace. In certain example embodiments of this invention, the beginning portion 20 of the furnace that does not have flame(s) 15 is at least about 10% of the total tempering furnace length, more preferably at least about 20%, sometimes at least about 30%, and sometimes at least about 40% of the furnace length.

Figure 3:
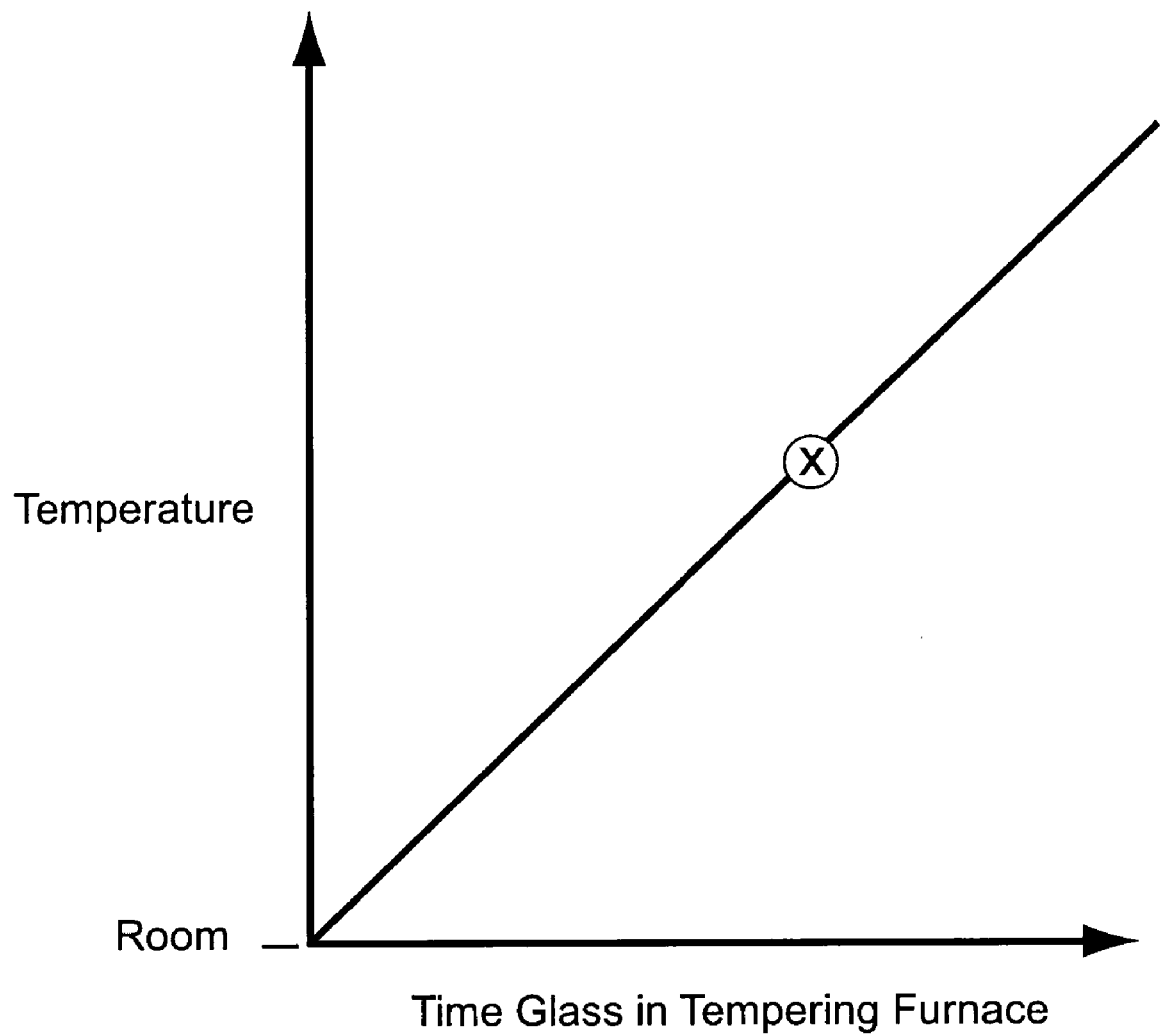
FIG. 3 is a graph illustrating a point in the thermal tempering furnace when the glass and/or coating reaches a predetermined temperature that is at or proximate the oxidation temperature of the TCO on the glass being tempered.

Thus, referring to FIGS. 2 and 3 for example, in certain example embodiments, the flame(s) 15 for burning off oxygen from the area proximate the TCO film 3 are provided only in a later portion (and not in the beginning portion 20) of the furnace so that the flame(s) are only proximate the surface of the TCO film 3 once the glass and/or TCO film reaches a predetermined temperature (see the indication on the curve in FIG. 3) at or near the TCO oxidation temperature which can vary based on the material making up the TCO film. For example, the oxidation temperature of zinc oxide based TCO films 3 is around 600 degrees C. Thus, in such embodiments, the flames are only provided in area where the glass 1 and/or TCO film 3 has reached a temperature of at least about 500 degrees C., more preferably at least about 550 degrees C., and possibly at least about 590 degrees C. This prevents flames from being wasted in areas where oxidizing of the TCO does not occur.

Electrical conductivity can be measured in terms of sheet resistance ($R_s$). The TCO films discussed herein have a sheet resistance ($R_s$) of no greater than about 200 ohms/square, more preferably no greater than about 100 ohms/square, and most preferably from about 5-100 ohms/square. The conductivity of a TCO film is often caused by depositing the film in a manner so that the film is substoichiometric with respect to oxygen. The oxygen substoichiometry causes oxygen vacancies which allow current to flow through the layer. As an example, stoichiometric zinc oxide (ZnO) is usually high resistive and thus dielectric in nature because of its wide bandgap; however, zinc oxide can be made conductive by creating nonidealities or point defects in its crystal structure to generate electrically active levels (e.g., by making it oxygen deficient which is substoichiometric with respect to oxygen) thereby causing its sheet resistance to drop significantly into the range discussed above. This can be done by using an oxygen deficient atmosphere during crystal growth and/or by doping.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method of making a coated article including a transparent conductive film, the method comprising:
   providing a glass substrate;
   forming a film comprising a transparent conductive oxide on the glass substrate; and
   tempering the coated article including the glass substrate and the film comprising the transparent conductive oxide, and wherein at least one flame is provided in a tempering furnace in order to burn off oxygen to prevent or reduce oxidizing of the film comprising transparent conductive oxide during tempering, wherein the flame is provided in addition to another heating element which performs the tempering, so that the tempering occurs regardless of the flame.

2. The method of claim 1, wherein the flame is provided within 20 cm of an upper surface of the film comprising transparent conductive oxide, and wherein the film comprising the transparent conductive oxide has a sheet resistance of from about 5-100 ohms/square.

3. The method of claim 1, wherein a plurality of flames are provided in the tempering furnace.

4. The method of claim 1, wherein following tempering the film is still electrically conductive.

5. The method of claim 1, wherein at least part of the flame is located within about 10 cm of a surface of the film comprising transparent conductive oxide.

6. The method of claim 1, wherein at least part of the flame is located within about 5 cm of a surface of the film comprising transparent conductive oxide.

7. The method of claim 1, wherein at least part of the flame is located within about 2 cm of a surface of the film comprising transparent conductive oxide.

8. The method of claim 1, wherein at least part of the flame touches the film comprising transparent conductive oxide in the tempering furnace.

9. The method of claim 1, wherein no flame or flames is/are provided in a beginning portion of the tempering furnace.

10. The method of claim 9, wherein the beginning portion of the tempering furnace where no flame is provided is at least about 10% of the length of the tempering furnace.

11. The method of claim 9, wherein the beginning portion of the tempering furnace where no flame is provided is at least about 20% of the length of the tempering furnace.

12. The method of claim 1, wherein said forming the film comprising transparent conductive oxide on the glass substrate comprising sputtering at least one sputtering target at approximately room temperature so that no heaters are used when forming the film on the glass substrate.

13. The method of claim 1, wherein another layer is provided on the glass substrate so as to be located between the glass substrate and the film comprising transparent conductive oxide.

14. The method of claim 1, wherein the coated article has a visible transmission of at least about 50% before and/or after the tempering.

15. A method of making a coated article including a transparent conductive film, the method comprising:
   providing a glass substrate;
   forming a transparent conductive film comprising a transparent conductive oxide on the glass substrate; and
   tempering the coated article including the glass substrate and the transparent conductive film, and wherein at least one flame is provided in a tempering furnace within about 20 cm of the transparent conductive film, wherein the flame, provided in order to burn off oxygen to prevent or reduce oxidizing of the film comprising transparent conductive oxide, is provided in addition to another heating element which performs the tempering, so that the tempering occurs regardless of the flame.

16. The method of claim 15, wherein the coated article has a visible transmission of at least about 50% before and/or after the tempering.

17. The method of claim 15, wherein the flame touches the transparent conductive film in the tempering furnace.

18. The method of claim 1, wherein the flame touches the film in the tempering furnace.

19. The method of claim 1, wherein the film comprising the transparent conductive oxide has a sheet resistance of no greater than about 200 ohms/square.

20. The method of claim 19, wherein the film comprising the transparent conductive oxide has a sheet resistance of no greater than about 100 ohms/square.

\* \* \* \* \*